(12) United States Patent
Lai et al.

(10) Patent No.: US 9,342,116 B2
(45) Date of Patent: May 17, 2016

(54) STACKED EXPANSION CARD ASSEMBLY

(71) Applicant: GIGA-BYTE TECHNOLOGY CO., LTD., New Taipei (TW)

(72) Inventors: Chih Ming Lai, New Taipei (TW); Yung Shun Kao, New Taipei (TW); Hui Ling Chung, New Taipei (TW); Tzu-Hsiang Huang, New Taipei (TW); Ji Chen Su, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 209 days.

(21) Appl. No.: 14/109,919

(22) Filed: Dec. 17, 2013

(65) Prior Publication Data

US 2015/0169013 A1 Jun. 18, 2015

(51) Int. Cl.
*G06F 1/18* (2006.01)
*G06F 1/20* (2006.01)

(52) U.S. Cl.
CPC . *G06F 1/185* (2013.01); *G06F 1/20* (2013.01)

(58) Field of Classification Search
CPC .................................. G06F 1/20; G06F 1/185
USPC .......... 361/679.02, 679.32, 679.54, 735, 736, 361/785, 790, 804, 810
See application file for complete search history.

(56) References Cited

U.S. PATENT DOCUMENTS

| 5,305,182 A * | 4/1994 | Chen ....................... G06F 1/183 361/679.31 |
| 7,342,794 B1 * | 3/2008 | Mease .................... H01L 23/367 165/80.3 |
| 7,746,654 B2 * | 6/2010 | Franz .................... H05K 7/1487 361/679.02 |
| 2008/0101049 A1 * | 5/2008 | Casto ........................ G06F 1/18 361/788 |

FOREIGN PATENT DOCUMENTS

| TW | 201228143 A1 | 7/2012 |
| TW | 201322878 A1 | 6/2013 |

* cited by examiner

*Primary Examiner* — Tuan T Dinh
*Assistant Examiner* — Mukund G Patel
(74) *Attorney, Agent, or Firm* — Chun-Ming Shih

(57) ABSTRACT

A stacked expansion card assembly is positioned on a mainboard. The mainboard includes a mainboard connector. The stacked expansion card assembly includes a first expansion card, at least one first supporting member, and a first connector. The first card includes a contact card end and electrically connected with the mainboard connector by inserting the contact end of the first expansion card to the mainboard connector. The first supporting member is positioned on the mainboard and supports the first expansion card. The first connector is positioned on the first expansion card and electrically connected or disconnected with a second expansion card by removable insertion of the second expansion card to the first connector. Thereby, the expansion cards can be installed onto the mainboard without increasing the surface area of the mainboard and limited by the layout of the electronic components on the mainboard.

21 Claims, 8 Drawing Sheets

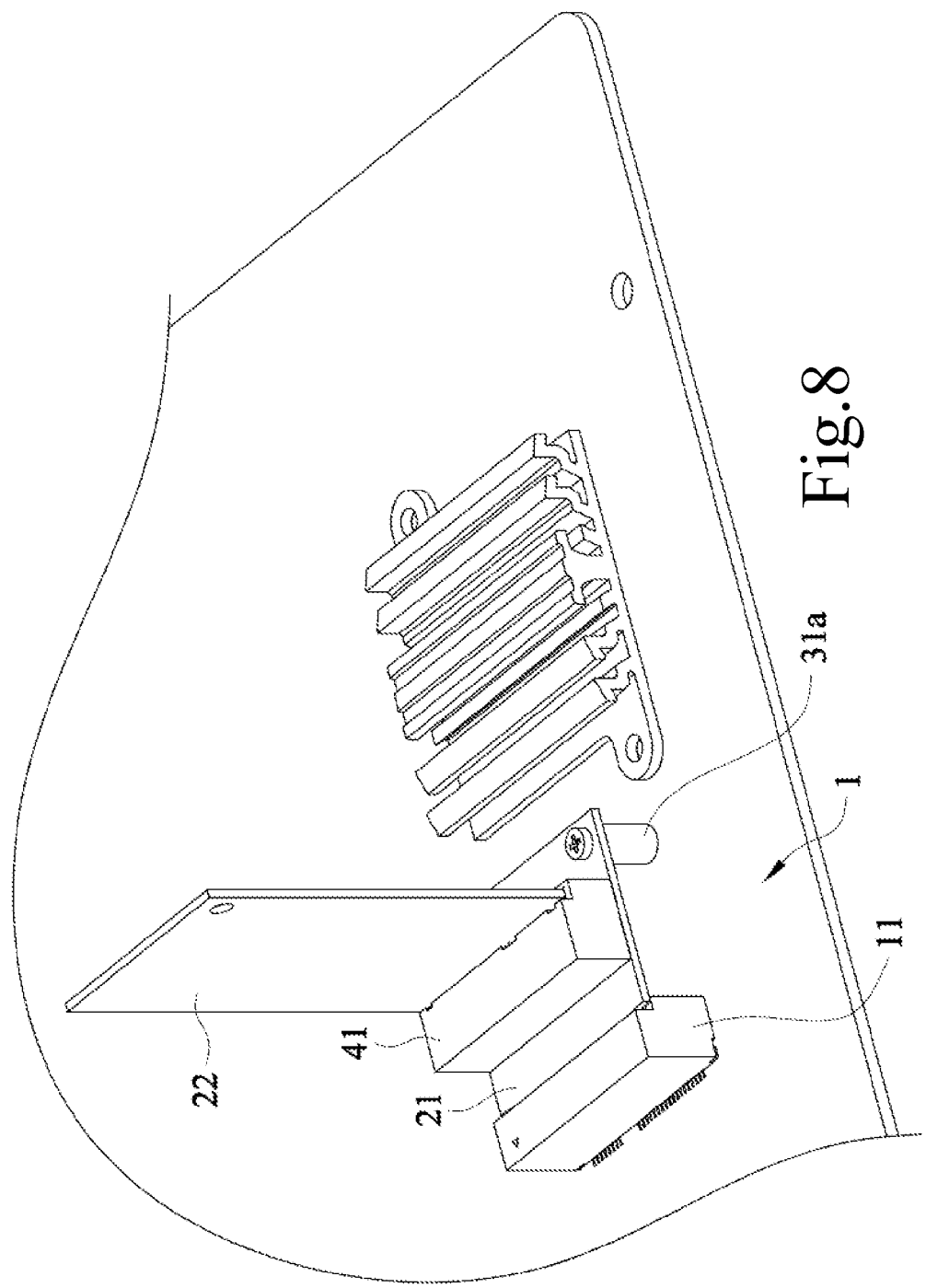

STACKED EXPANSION CARD ASSEMBLY

BACKGROUND OF THE INVENTION

1. Field of the Invention

The present invention is related to an expansion card assembly and, more particularly, to a stacked expansion card assembly positioned on a mainboard.

2. Description of the Related Art

Generally, a plurality of electronic components are positioned on a mainboard of a computer or an electrical product (such as a mobile phone or a tablet computer) to provide functions for the computer or the electrical device to execute. There are variety types of electronic components, such as an amplifier or a receiver. Electronic component can also be a single package component such as a resistor, a capacitor, or an inductor. Electronic component can also be an integrated package, such as an operational amplifier, a logic gate. Electronic components connect with each other to construct a circuit with specific function. A conventional way to connect the electronic components is to weld the electronic components onto the mainboard.

With the technical improvement of computers and electrical products, more electronic components have to be welded on the mainboard to provide more functions. Therefore, the manufacturers often design more than one slot or connector on the mainboard, and hence more than one external expansion card, such as network interface card (NIC), sound card, display card and PCI card, is able to insert into the corresponding slot or connector.

However, in the trend of microminiaturization of the computers and the electrical products, the manufacturers prefer to design a mainboard with much more function and meanwhile to decrease the size of the mainboard. As a result, the way of positioning a plurality of slots or connectors on the mainboard and a plurality of expansion cards installing to the corresponding slots or connectors causes the problems of increasing the surface area of the mainboard and limiting the positioning space for other electrical components to position on the mainboard.

Therefore, there is a need to expanse function of the computer or the electrical product without increasing surface area of the mainboard, and to decrease the positioning space limitation for other electrical components while installing extra expansion cards on the mainboard for the manufacturers.

SUMMARY OF THE INVENTION

In view of the needs mentioned above, the disclosure provides a stacked expansion card assembly, so as to solve the problems of increasing the surface area of the mainboard and limiting the positioning space for other electrical components to position on the mainboard.

The stacked expansion card assembly is positioned on a mainboard. The mainboard includes a mainboard connector. The stacked expansion card assembly includes a first expansion card, a first supporting member, and a first connector. The first expansion card includes a contact end. The first expansion card is electrically connected with the mainboard connector by inserting into the contact end of the first expansion card to the mainboard connector. The first supporting member is positioned on the mainboard and supports the first expansion card. The first connector is electrically connected or disconnected with a second expansion card by removable insertion of the second expansion card to the first connector.

In one or more embodiments, the second expansion card is parallel to the first expansion card.

In one or more embodiments, the first supporting member is a fin of a heat sink. The fin supports a free end of the first expansion card. The free end of the first expansion card is located opposite to the contact end of the first expansion card.

In one or more embodiments, the first supporting member includes a sleeve and a bolt. The mainboard includes a mainboard positioning hole. The first expansion card includes a first positioning hole. The bolt runs through the first positioning hole and inserts into the sleeve. The sleeve inserts the mainboard positioning hole.

In one or more embodiments, the stacked expansion card assembly further includes a second connector. The second connector is positioned on the first expansion card. The second connector is abutting the first connector. The second connector is electrically connected or disconnected with a third expansion card by removable insertion of the third expansion card to the second connector.

In one or more embodiment, the third expansion card is parallel to first expansion card.

In one or more embodiments, the stacked expansion card assembly further includes a second supporting member. The second supporting member is positioned on the first expansion card and supports the third expansion card.

In one or more embodiments, the second supporting member includes a sleeve and a bolt. The first expansion card includes a second positioning hole. The third expansion card includes a third positioning hole. The bolt runs through the third positioning hole and inserts into the sleeve. The sleeve inserts the second positioning hole.

In one or more embodiments, the stacked expansion card assembly further includes a third supporting member. The third supporting member is positioned on the first expansion card. The third supporting member supports the second expansion card.

In one or more embodiments, the third supporting member includes a sleeve and a bolt. The first expansion card includes a forth positioning hole. The second expansion card includes a fifth positioning hole. The bolt runs through the fifth positioning hole and inserts into the sleeve. The sleeve inserts the forth positioning hole.

In one or more embodiments, the stacked expansion card assembly further includes a third connector. The third connector is positioned on the second expansion card. The third connector is electrically connected or disconnected with a forth expansion card by removable insertion of the forth expansion card to the third connector.

In one or more embodiments, the forth expansion card is parallel to the second expansion card.

In one or more embodiments, the first expansion card further includes a protrusion portion. The protrusion portion is extended from one side of the first expansion card. The first supporting member supports the protrusion portion.

Through the first expansion card and the first connector of the stacked expansion card assembly according to one or more embodiments of the present invention, the second expansion card is able to be electrically connected or disconnected with the motherboard by removably inserting into the first connector. In addition, the first supporting member supports the first expansion card to spread the weight of the first connector, so as to have the first expansion card to be stacked firmly above the mainboard. In this way, the expansion of function of the computer or the electrical product can be reached without increasing the surface area of the mainboard. Furthermore, a plurality of expansion cards can be positioned above the mainboard without positioning a plurality of slots or connectors directly on the mainboard, so as to eliminate the positioning space limitation for other electrical components to position on the mainboard while installing additional expansion cards onto the mainboard.

BRIEF DESCRIPTION OF THE DRAWINGS

The present invention will become more fully understood from the following detailed description of some illustrative embodiments in conjunction with the accompanying drawings, in which:

FIG. 8 is a three-dimensional view of the stacked expansion card assembly in accordance with a forth embodiment.

PREFERRED EMBODIMENTS OF THE INVENTION

The following embodiments, although the hardware configurations, connection types, or steps are varied, are provided so that this disclosure will be thorough and complete and thus will fully convey the scope of the invention to those skilled in the art. It is worth noting that the same symbol represents the same or similar structural member or device with the same or similar function. In addition, the forms of the expansion cards and the connectors disclosed herein should not be limited. For example, in the embodiment that the expansion card is PCI card, the connecter is the PCI slot. In the embodiment that the expansion card is a WIFI card, the connector is designed to match with the WIFI card.

Figure 1:
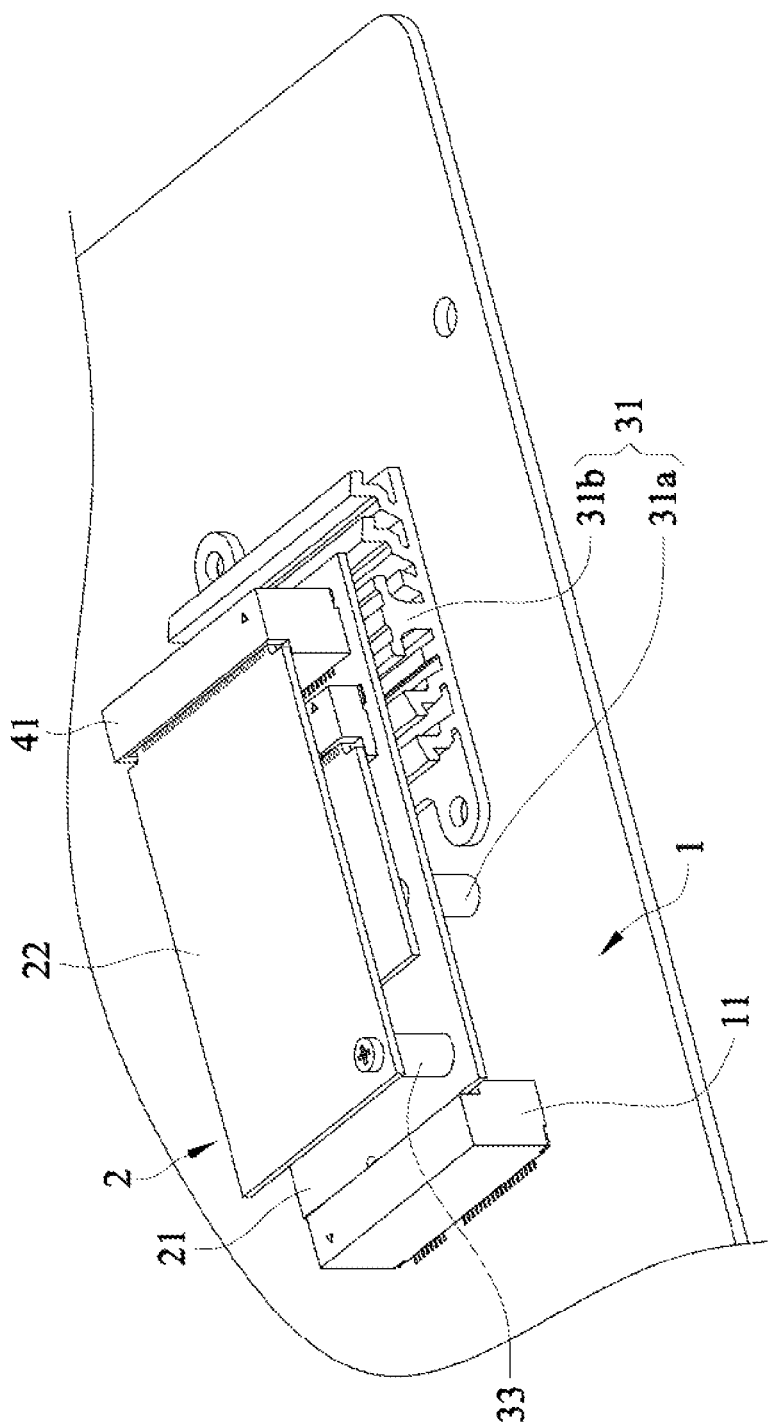
FIG. 1 is a three-dimensional view of the stacked expansion card assembly in accordance with a first embodiment.
Figure 2:
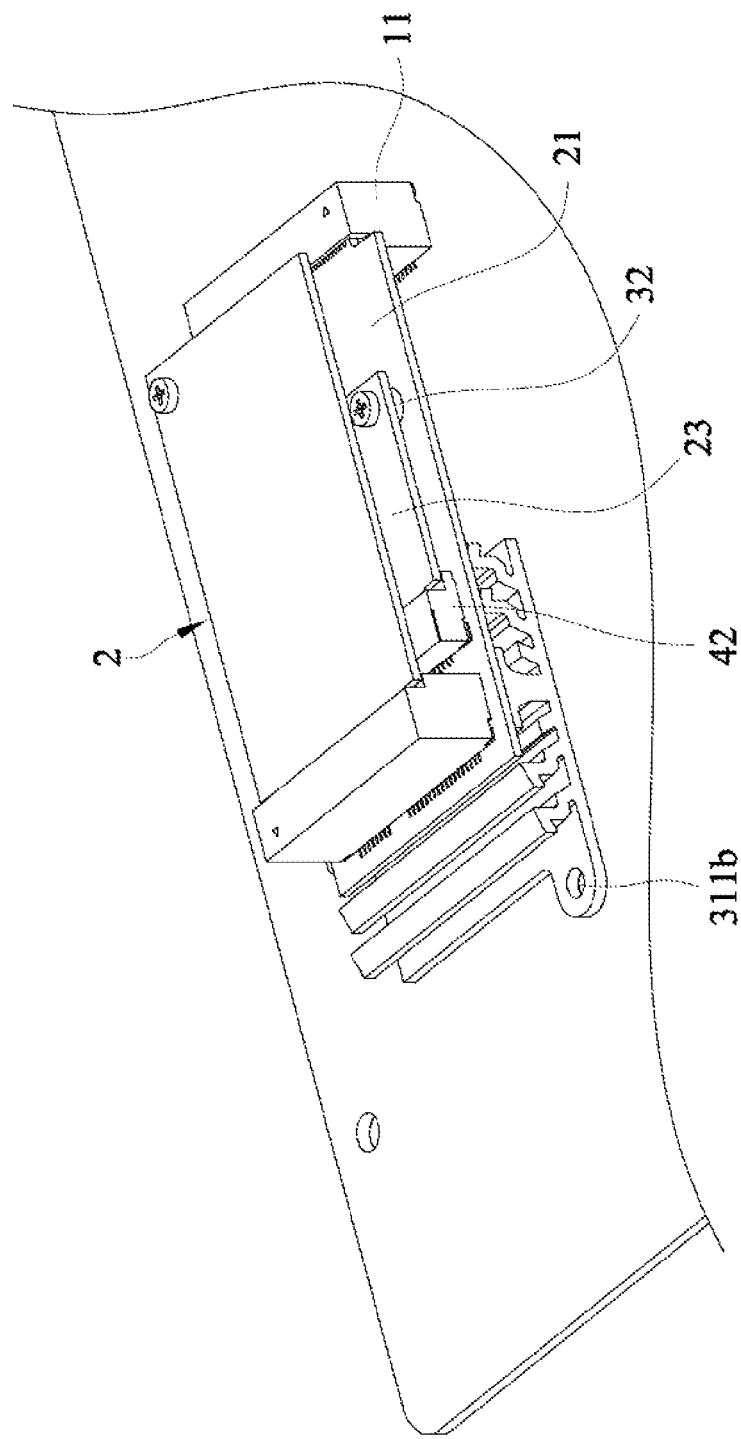
FIG. 2 is another three-dimensional view of the stacked expansion card assembly referring to FIG. 1.
Figure 3:
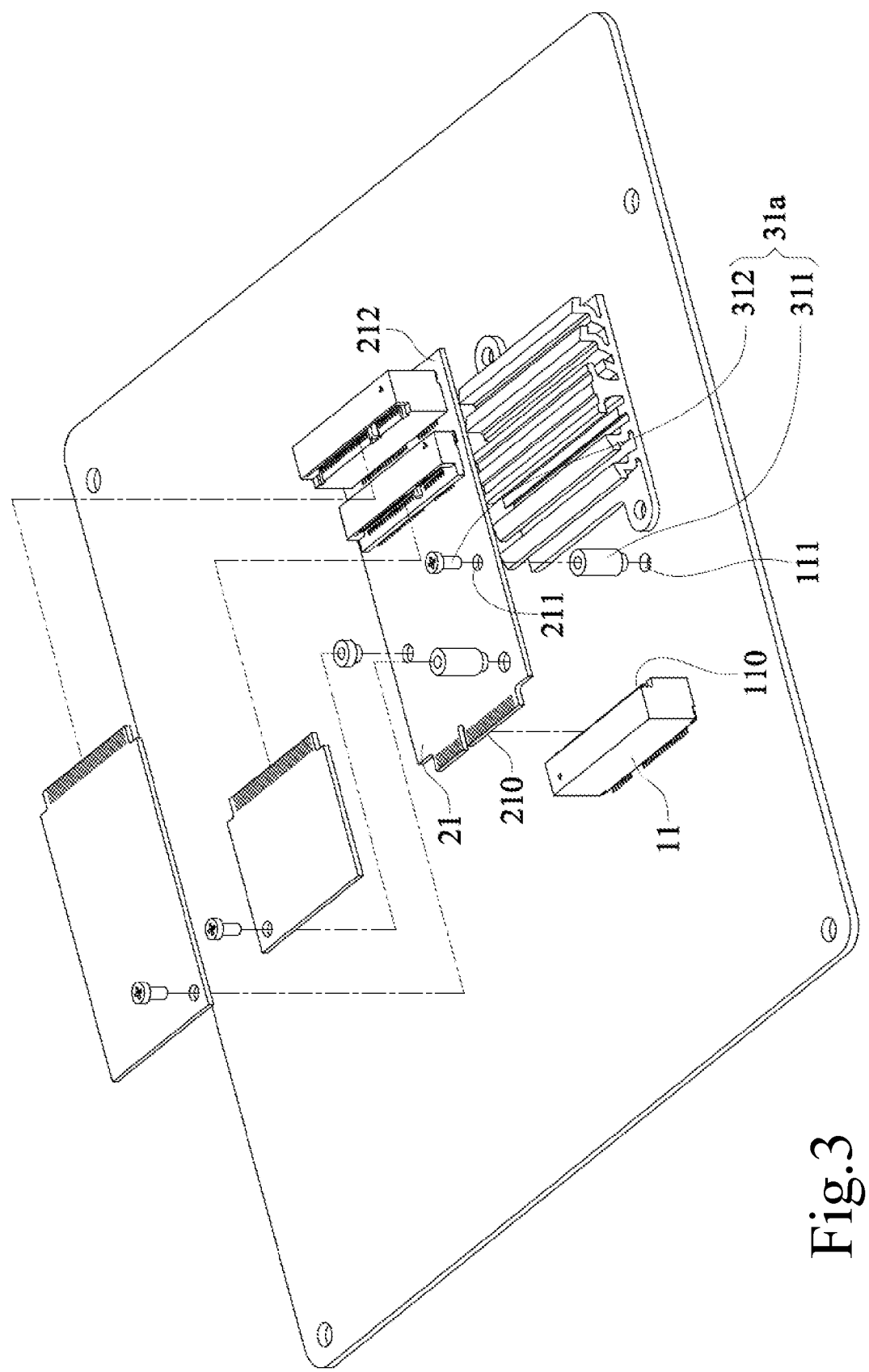
FIG. 3 is an exploded view of the stacked expansion card assembly referring to FIG. 1.
Figure 4:
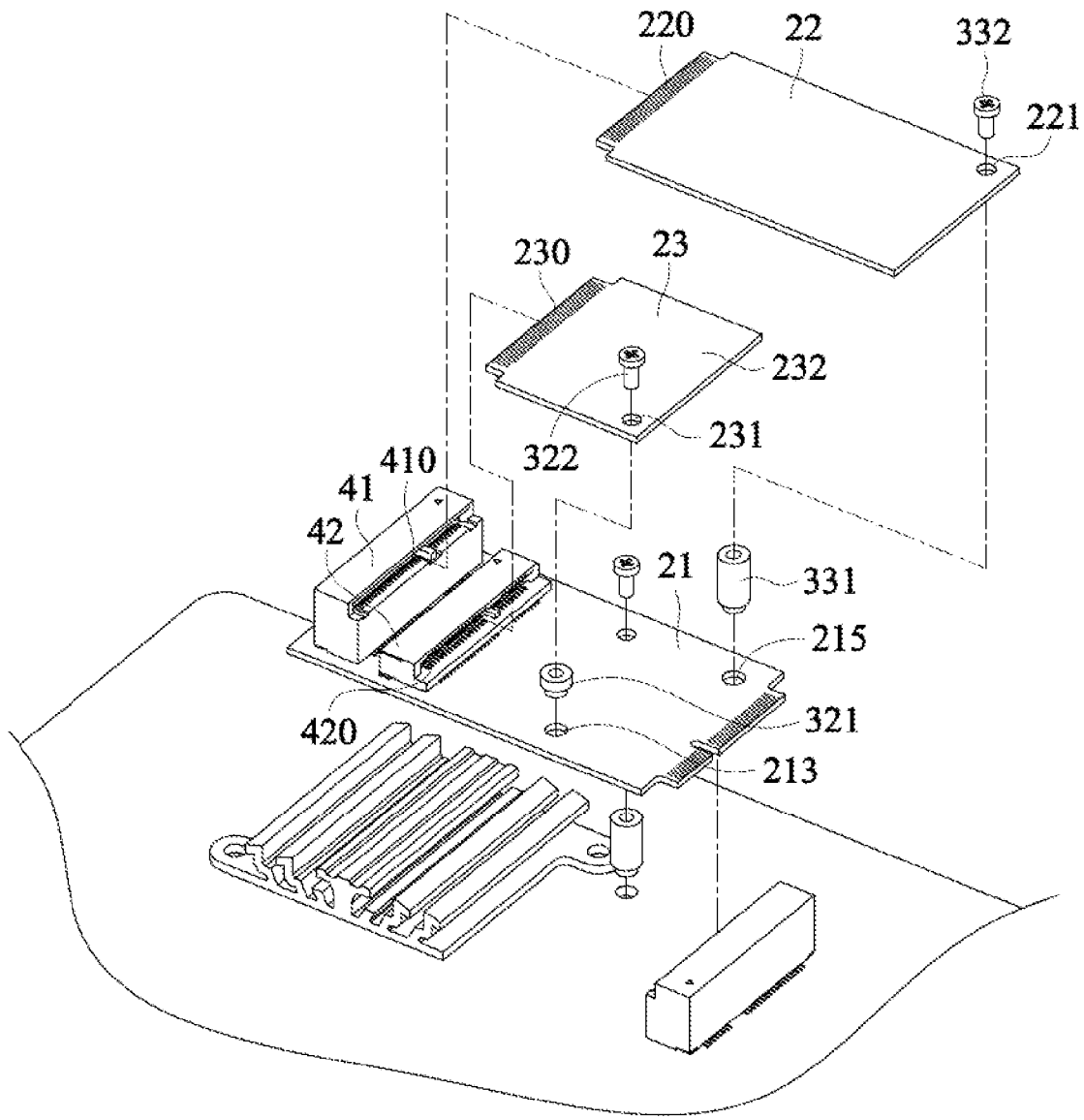
FIG. 4 is an exploded view of the stacked expansion card assembly referring to FIG. 2.

Please refer to FIG. 1 to FIG. 4 according to the first embodiment. FIG. 1 is a three-dimensional view of a stacked expansion card assembly in accordance with a first embodiment. FIG. 2 is another three-dimensional view of the stacked expansion card assembly referring to FIG. 1. FIG. 3 is an exploded view of the stacked expansion card assembly referring to FIG. 1. FIG. 4 is an exploded view of the stacked expansion card assembly referring to FIG. 2.

Referring to FIG. 1, the stacked expansion card assembly 2 in accordance with the first embodiment is positioned on a mainboard 1. The mainboard 1 includes a mainboard connector 11. The stacked expansion card assembly 2 includes a first expansion card 21, at least one first supporting member 31 and a first connector 41. The first supporting member 31 is positioned on the mainboard 1. The first supporting member 31 supports the first expansion card 21. The first connector 41 is electrically positioned on the first expansion card 21. The first connector 41 is electrically connected or disconnected to a second expansion card 22 by removable insertion of the second expansion card 22 to the first connector 41. The second expansion card 22 is parallel to the first expansion card 21.

More specifically, please refer to FIG. 1 and FIG. 3 with continued reference to FIG. 1. The first expansion card 21 includes a contact end 210 and a free end 212. The free end 212 is located opposite to the contact end 210. In other words, the contact end 210 and the free end 212 are respectively located at two opposite ends of the first expansion card 21. In the first embodiment, the contact end 210 is a contact finger. The contact end 210 of the first expansion card 21 inserts into the mainboard connector 11. More, specifically, the mainboard 1 includes a socket 110. The contact end 210 of the first expansion card 21 inserts into the socket 110 of the mainboard connector 11. Therefore, the mainboard connector 21 is electrically connected with the first expansion card 21. The first expansion card 21 is parallel to the mainboard 1.

The supporting member in the first embodiment can be, but not limited to, a fin of a fin heat sink or a supporting pillar. Please refer to FIG. 1. In the first embodiment the stacked expansion card assembly 2 includes two supporting members 31. One is a fin 31b of a heat sink, and the other is a supporting pillar 31a. The fin 31b supports the free end 211 of the first expansion card 21 (see FIG. 3). Please, further refer to FIGS. 1 and 2, the fin heat sink including the fin 31b further includes at least one fixing hole 331b, through a fixing member such as a bolt (figure not shown) runs through the fixing hole 331b the fin heat sink including the fin 31b can be fixed on the mainboard 1. The structure of the heat sink is not limited to the embodiment, in other words, a heat sink with the function of supporting the first expansion card 21 and the function of heat dissipation can be used to serve as a supporting member 31 of the present invention. Disposing the fin 31b at the free end 212 avoids interfering with the electronic components on the first expansion card 21 and provides support to the first expansion card 21.

Please refer to FIG. 3. The supporting pillar 31a includes a sleeve 311 and a bolt 312. The mainboard 1 further includes a mainboard positioning hole 111. The first expansion card 21 further includes a first positioning hole 211. The bolt 312 runs through the first positioning hole 211 and inserts into the sleeve 311. The sleeve 311 is inserted into the mainboard positioning hole 111. Therefore, the first supporting member 31 and the mainboard connector 11 are able to support the weight of the electronic components (such as the first connector 41) positioned on the first expansion card 21. In this way, the first expansion card 21 is able to be stacked firmly above the mainboard 1. The location of the supporting pillar 31a is not limited to the first embodiment. In the first embodiment, the supporting pillar 31a is positioned near the free end 212 of the first expansion card 21, so as to avoid interfering with the position of the electronic components on the first expansion card 21 and to provide better support to the first expansion card 21. The supporting pillar 31a is made of metal such as copper or copper alloy, but it should not be limited to the first embodiment. The supporting pillar 31a made of metal not only provides support to the first expansion card 21, but also provide function of thermal conduction to dissipate heat while the expansion cards are in use.

Further referring to FIG. 1, the first connector 41 of the stacked expansion card assembly 2 is electrically positioned on the first expansion card 21. The first connector 41 can be designed corresponding to the specific expansion card. For example, the connector is a PCI-E slot for a PCI expansion card to be inserted into. Referring to FIG. 4, the first connector 41 includes a socket 410. The second expansion card 22 includes a contact end 220 (such as a contact finger). The contact end 220 of the second expansion card 22 removably inserts into the socket 410 of the first connector 41. Therefore, the first connector 41 is electrically connected or disconnected with the second expansion card 22.

In the first embodiment, the socket 410 is positioned at the upper side of the first connector 41. The contact end 220 of the second expansion card 22 inserts into the socket 410 of the first connector 41 in a parallel manner. Therefore, the second expansion card 22 is parallel to the first expansion card 21. In this way, the second expansion card 22 is able to be stacked above the first expansion card 21 in a parallel manner via the first connector 41. Therefore, there is no need to install extra connectors on the mainboard, and users or manufactures are able to stack extra expansion cards layer by layer above the mainboard, so as to expanse function of the computer or the electrical product without limiting the position space of the electronic components on the mainboard.

Because the first expansion card 21 is parallel to the second expansion card 22, additional connectors are able to be installed on the first expansion card 21 or the second expansion card 22. Therefore, extra expansion cards are able to insert into the corresponding connectors. More specifically, please refer to FIG. 2, the stacked expansion card assembly 2 further includes a second connector 42. The second connector 42 is positioned on the first expansion card 21 and is abutting the first connector 41. The second connector 42 is electrically connected or disconnected with a third expansion card 23 by removable insertion of the third expansion card 23 to the second connector 42. The third expansion 23 is parallel to the first expansion card 21.

Please further refer to FIG. 4. The second connector 42 includes a socket 420. The second connector 42 can be designed corresponding to the specific expansion card. For example, the connector is a PCI-E slot for a PCI expansion card to be inserted in. The third expansion card 23 includes a contact end 230(such as a contact finger). The contact end 230 of the third expansion card 23 inserts into the socket 420 of the second connector 42 in a parallel manner. The socket 42 is positioned at the upper side of the second connector 42. In this way, the third expansion card 23 is parallel to the first expansion card 21, and hence, extra expansion cards are able to be stacked layer by layer above the mainboard, so as to expanse function of the computer or the electrical product without installing extra connectors directly on the mainboard and without limiting the position space of the electronic components positioned on the mainboard. In addition, the height of the first connector 41 is larger than the height of the second connector 42, and the second expansion card 22 and the third expansion card 23 are parallel to the first expansion card 21, in this way, the third expansion card 23 is stacked between the second expansion card 22 and the first expansion card 21, so as to decrease the stack space of the stacked expansion card assembly 2.

Please refer to FIG. 2. The stacked expansion card assembly 2 further includes a second supporting member 32. The second supporting member 32 is positioned on the first expansion card 21. The second supporting member 32 supports the third expansion card 23. More specifically, please refer to FIG. 4. The second supporting member 32 is a supporting pillar including a sleeve 321 and a bolt 322. The first expansion card 21 further includes a second positioning hole 213. The third expansion card 23 includes a contact end 230 and a free end 232. The third expansion card further includes a third positioning hole 231. The third positioning hole is positioned at the free end 232. The bolt 322 runs through the third positioning hole 231 and inserts into the sleeve 321. The sleeve 321 is inserted into the second positioning hole 213. Supported by the second supporting member 32, the third expansion card 23 is able to be stacked firmly above the mainboard 1. In addition, the second positioning hole 213 and the third positioning hole 231 are respectively located at the side of the expansion cards, so as to prevent interfering with the position of the electronic components on the third expansion card 23 and the first expansion card 21. The second supporting member 32 is made of metal such as copper or copper alloy, but it should not be limited to the first embodiment. The second supporting member 32 made of metal not only provides support to the third expansion card 23, but also provides function of thermal conduction to dissipate heat while the expansion cards are in use.

Please refer to FIG. 1. The stacked expansion card assembly 2 further includes a third supporting member 33. The third supporting member 33 is positioned on the first expansion card 21. The third supporting member 33 supports the second expansion card 22. More specifically, the third supporting member 33 is a supporting pillar including a sleeve 331 and a bolt 332 (see FIG. 4). The first expansion card 21 further includes a forth positioning hole 215. The second expansion card 22 further includes a fifth positioning hole 221. The bolt 332 runs through the fifth positioning hole 221 and inserts into the sleeve 331. The sleeve 331 inserts into the forth positioning hole 215. The third supporting member 33 supports the weight of the electronic components on the second expansion card 22. Therefore, the second expansion card 22 is able to be stacked firmly above the first expansion card 21. The third supporting member 33 is made of metal such as copper or copper alloy, but it should not be limited to the first embodiment. The third supporting member 33 made of metal not only provides support to the second expansion card 22, but also provides function of thermal conduction to dissipate while the expansion cards are in use.

The stacked expansion card assembly of the present invention should not be limited to the first embodiment. In other words, a stacked expansion card assembly including at least one expansion card stacked parallel above a mainboard, and a connector positioned on the expansion card for another expansion card to insert thereinto for expanding function of the computer or the electrical product without increasing the surface area of the mainboard and without interfering with the position space of the electronic components on the mainboard is the key feature of the present invention. The following are some other embodiments to fully understand the present invention.

Figure 5:
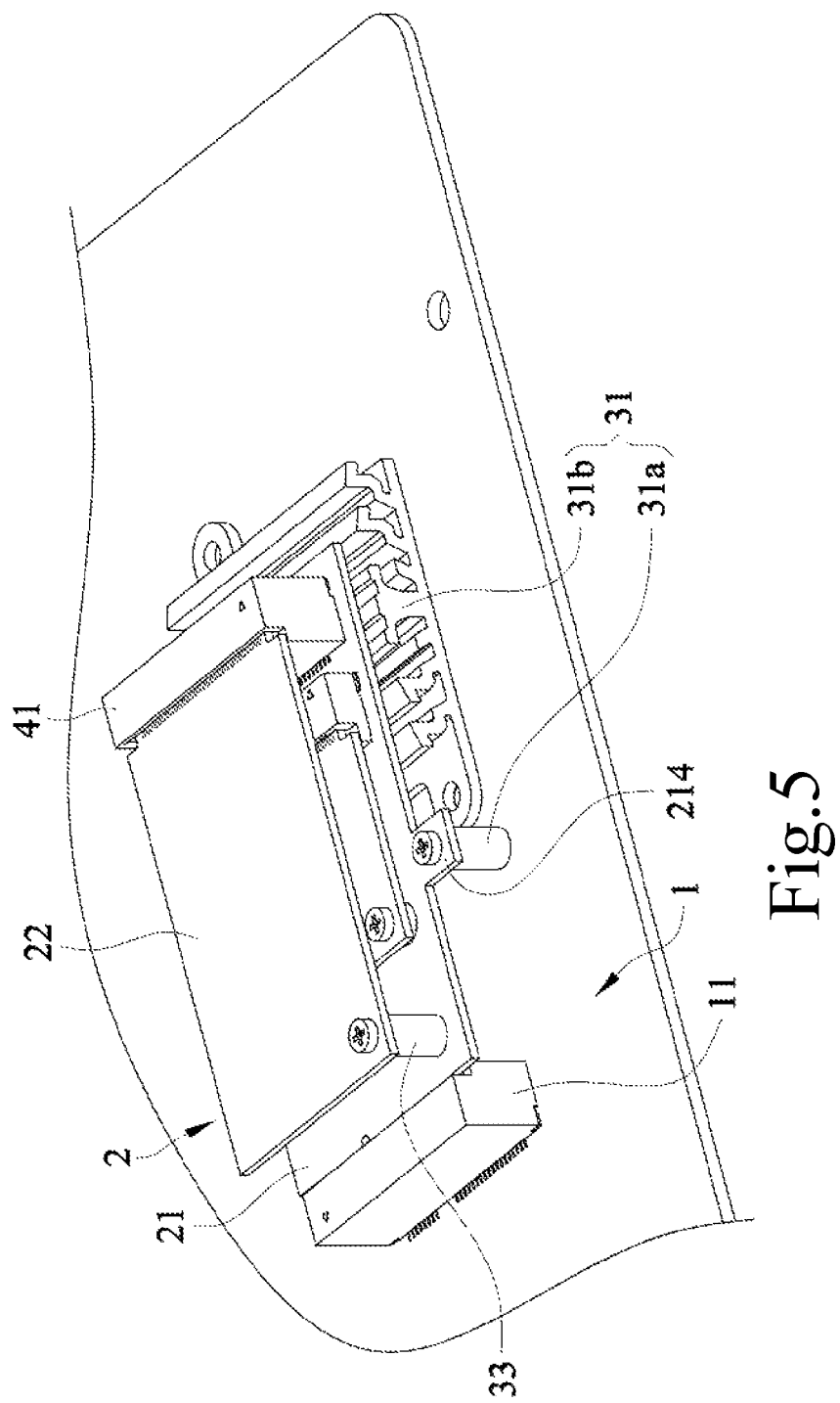
FIG. 5 is a three-dimensional view of the stacked expansion card assembly in accordance with a second embodiment.
Figure 6:
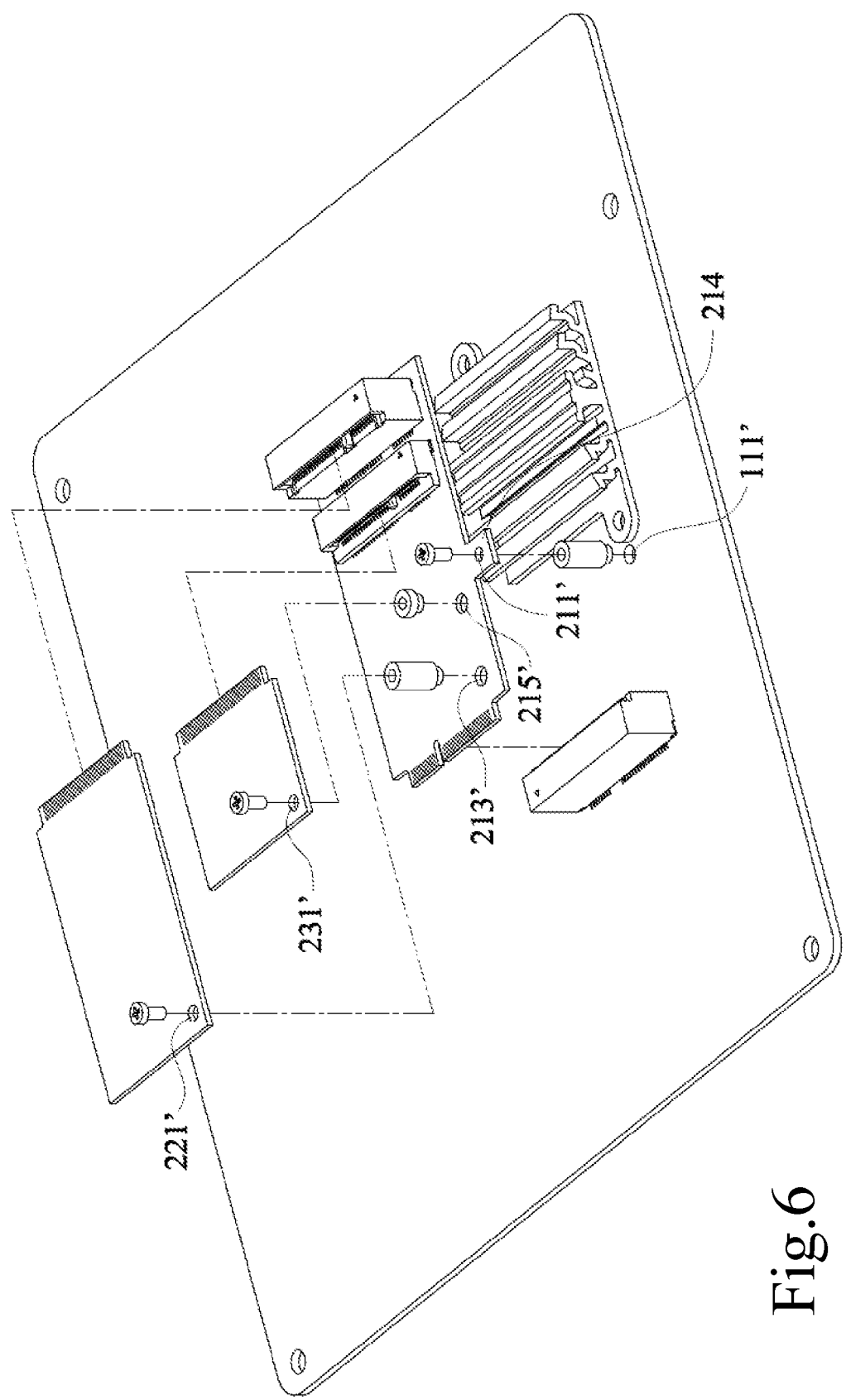
FIG. 6 is an exploded view of the stacked expansion card assembly referring to FIG. 5.

Please refer to FIG. 5 and FIG. 6. FIG. 5 is a three-dimensional view of the stacked expansion card assembly in accordance with a second embodiment; FIG. 6 is an exploded view of the stacked expansion card assembly referring to FIG. 5. The structure and the position of the stacked expansion card assembly 2 in accordance with the second embodiment is substantially the same as the stacked expansion card assembly 2 in accordance with the first embodiment. The same symbol or unmarked structure in FIGS. 5 and 6 represents the same structure as described in the first embodiment. The following disclosure is focus on the differences between the first and the second embodiment.

Please refer to FIG. 5. First, the first expansion card 21 of the stacked expansion card assembly 2 in accordance with the second embodiment further includes a protrusion portion 214. The protrusion portion 214 is extended from a side of the first expansion card 21. The supporting pillar 31a supports the protrusion portion 214 of the first expansion card 21. More specifically, please refer to FIG. 6, a first positioning hole 211' is positioned on the protrusion portion 214 of the first expansion card 21. A mainboard positioning hole 111' is positioned on the mainboard 1. The structure of the supporting pillar 31a in accordance with the second embodiment is the same as that described in the first embodiment. The difference is that the supporting pillar 31a runs through the first positioning hole 211' of the protrusion portion 214, and inserts into the mainboard positioning hole 111'. In this way, the first supporting member 31 in accordance with the second embodiment supports the first expansion card 121 firmly without interfering with the position of the electronic components positioned on the first expansion card 21 and the mainboard 1.

Please, further refer to FIG. 6. The forth positioning hole 215' and the second positioning hole 213' of the first expansion card 21 in accordance with the second embodiment are respectively located at the same side of the first expansion card 21. The third positioning hole 231' corresponds to the forth positioning hole 215'. The fifth positioning hole 221' corresponds to the second positioning hole 213'. In this way, the second supporting member 32 and the third supporting member 33 are positioned at the same side. With the supporting pillars positioned at the same side, users are able to view the electronic components on the expansion cards in a better angle of view comparing to the supporting members positioned at the opposite sides.

Figure 7:
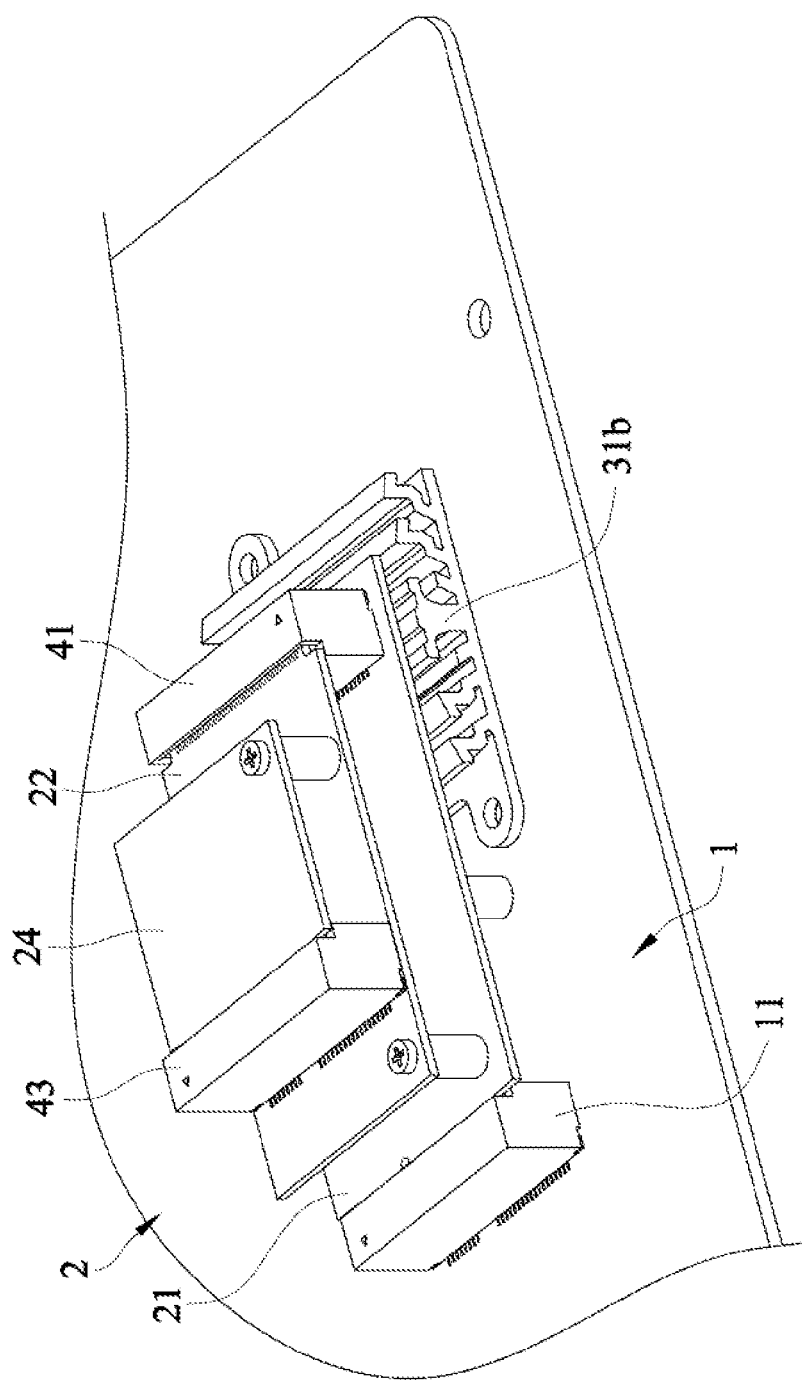
FIG. 7 is a three-dimensional view of the stacked expansion card assembly in accordance with a third embodiment.

Please refer to FIG. 7. FIG. 7 is a three-dimensional view of the stacked expansion card assembly in accordance with a third embodiment. The same symbol or unmarked structure in FIG. 7 represents the same structure as that described in the first embodiment. The following disclosure is focus on the differences between the first and the third embodiment.

Please refer to FIG. 7. The stacked expansion card assembly 2 in accordance with the third embodiment does not include the second connector 42. The stacked expansion card assembly 2 in accordance with the third embodiment includes a third connector 43. The third connector 43 is positioned on the second expansion card 22. The third connector 43 is electrically connected or disconnected with a forth expansion card 24 by removable insertion of the forth expansion card 24 to the third connector 43. The forth expansion card 24 is parallel to the second expansion card 22. The third supporting member 33 as that of the first embodiment (see FIG. 1) supports the weight of the third connector 43 positioned on the second expansion card 22. Therefore, the second expansion card 22 is able to be stacked firmly above the first expansion card 21.

In another embodiment, the stacked expansion card assembly 2 includes both the second connector 42 and the third connector 43. The third expansion card 23 removably inserts into the second connector 42. The forth expansion card 24 removably inserts into the third connector 43. In this way, users or manufactures are able to stack extra expansion cards layer by layer above the mainboard to expanse function of the computer or the electrical product without increasing the surface area of the mainboard.

Please refer to FIG. 8, which is a three-dimensional view of the stacked expansion card assembly in accordance with a forth embodiment. The same symbol or unmarked structure in FIG. 8 represents the same or similar structure as described in the first embodiment. The following disclosure is focus on the differences between the first and the forth embodiment. In the foregoing first to third embodiments, the second expansion card 22 is parallel to the first expansion card 21. Referring to FIG. 8, the second expansion card 22 in accordance with the forth embodiment is inserted vertically to the first connector 41. Therefore, the second expansion card 22 is vertical to the first expansion card 21. In the foregoing embodiments, the third expansion card 23 or the forth expansion card 24 can also be designed to vertically insert into the corresponding second connector 42 or corresponding third connector 43.

The stacked expansion card assembly in accordance with the foregoing embodiments is able to be positioned on a mainboard. The stacked expansion card assembly includes a first expansion card with a first connector. In this way, a second expansion card is able to be electrically connected with the first connector by removable insertion of the second expansion card to the first connector. Therefore, at least two expansion cards are able to be stacked in the way of lifting up the expansion cards above the mainboard, so as to provide more area to expanse function of the computer or the electrical product without increasing the surface area of the mainboard and overcome the surface space limitation. In addition, with the first supporting member positioned on the mainboard and supporting the first expansion card, so as to support the weight of the first connector on the first expansion card, and hence the first expansion card is able to be stacked firmly above the mainboard.

Furthermore, with the first expansion card with a first connector removably inserting to the mainboard, users or manufacturers can change expansion cards depending on the needs. For example, the first expansion card with a first connector can be replaced by a WIFI card. Besides, in some embodiments, there are some additional advantages as listed below:

1. In the embodiment that the first expansion card is stacked parallel to the second expansion card, extra connectors are able to be positioned on the first expansion card or on the second expansion card. In this way, another expansion card is able to be stacked above the expansion cards. Therefore, a plurality of expansion cards are able to be stacked above the mainboard layer by layer so as to expanse the function of a computer or an electrical product without increasing the surface area of the mainboard and without interfering with the position of the electronic components on the mainboard.

2. In the embodiment that the supporting member positioned on an expansion card so as to supports the weight of the electronic components (such as connector) positioned on another expansion card located above, therefore, the expansion card located above is able to be stacked firmly above the expansion card located below.

3. In the embodiment that the first expansion card with a protrusion portion, the first supporting member is able to support the first expansion card without interfering the position of the electronic components on the first expansion card and the mainboard.

4. In the embodiment that the supporting member is a heat sink, the heat sink not only supports the first expansion card, but also provides heat dissipation.

5. In the embodiment that the supporting member is made of metal such as the supporting pillar made of cupper, the supporting member not only supports the expansion card, but also provides heat conduction.

Although the invention has been described with the above embodiments, the person with the ordinary skill in the art can modify the shape, structure, characteristics and quantities of some elements described in the claims of this invention without departing from the spirit of the invention. Accordingly, the scope of the invention will be defined by the appended claims but not by the above detailed descriptions.

What is claimed is:

1. A stacked expansion card assembly positioned on a mainboard, the mainboard including a mainboard connector, and the stacked expansion card assembly comprising:
   a first expansion card, including a contact end and electrically connected with the mainboard connector by inserting the contact end of the first expansion card to the mainboard connector;
   a first supporting member, positioned on the mainboard and supporting the first expansion card;
   a first connector, positioned on the first expansion card, and electrically connected or disconnected with a second expansion card by removable insertion of the second expansion card to the first connector, wherein the first supporting member is a fin of a heat sink, the fin supports a free end of the first expansion card, and the free end of the first expansion card is located opposite to the contact end of the first expansion card, and wherein the first expansion card further comprises a protrusion portion extended from one side of the first expansion card, and the first supporting member supports the protrusion portion.

2. The stacked expansion card assembly as claimed in claim 1, wherein the second expansion card is parallel to the first expansion card.

3. The stacked expansion card assembly as claimed in claim 2, wherein the first supporting member includes a sleeve and a bolt, the mainboard comprises a mainboard positioning hole, the first expansion card comprises a first positioning hole, the bolt runs through the first positioning hole and inserts into the sleeve, and the sleeve inserts into the mainboard positioning hole.

4. The stacked expansion card assembly as claimed in claim 2, further comprising a second connector positioned on the first expansion card, abutting the first connector, and electrically connected or disconnected with a third expansion card by removable insertion of the third expansion card to the second connector.

5. The stacked expansion card assembly as claimed in claim 4, wherein the third expansion card is parallel to the first expansion card.

6. The stacked expansion card assembly as claimed in claim 4, further comprising a second supporting member positioned on the first expansion card and supporting the third expansion card.

7. The stacked expansion card assembly as claimed in claim 6, wherein the second supporting member includes a sleeve and a bolt, the first expansion card comprises a second positioning hole, the third expansion card comprises a third positioning hole, the bolt runs through the third positioning hole and inserts into the sleeve, and the sleeve inserts into the second positioning hole.

8. The stacked expansion card assembly as claimed in claim 2, further comprising a third supporting member positioned on the first expansion card and supporting the second expansion card.

9. The stacked expansion card assembly as claimed in claim 8, wherein the third supporting member includes a sleeve and a bolt, the first expansion card comprises a forth positioning hole, the second expansion card comprises a fifth positioning hole, the bolt runs through the fifth positioning hole and inserts into the sleeve, and the sleeve inserts the forth positioning hole.

10. The stacked expansion card assembly as claimed in claim 8, further comprising a third connector positioned on the second expansion card and electrically connected or disconnected with a forth expansion card by removable insertion of the forth expansion card to the third connector.

11. The stacked expansion card assembly as claimed in claim 10, wherein the forth expansion card is parallel to the second expansion card.

12. The stacked expansion card assembly as claimed in claim 2, wherein the first expansion card further comprises a protrusion portion extended from one side of the first expansion card, and the first supporting member supports the protrusion portion.

13. The stacked expansion card assembly as claimed in claim 1, wherein the first supporting member includes a sleeve and a bolt, the mainboard comprises a mainboard positioning hole, the first expansion card comprises a first positioning hole, the bolt runs through the first positioning hole and inserts into the sleeve, and the sleeve inserts into the mainboard positioning hole.

14. The stacked expansion card assembly as claimed in claim 1, further comprising a second connector positioned on the first expansion card, abutting the first connector, and electrically connected or disconnected with a third expansion card by removable insertion of the third expansion card to the second connector.

15. The stacked expansion card assembly as claimed in claim 14, wherein the third expansion card is parallel to the first expansion card.

16. The stacked expansion card assembly as claimed in claim 14, further comprising a second supporting member positioned on the first expansion card and supporting the third expansion card.

17. The stacked expansion card assembly as claimed in claim 16, wherein the second supporting member includes a sleeve and a bolt, the first expansion card comprises a second positioning hole, the third expansion card comprises a third positioning hole, the bolt runs through the third positioning hole and inserts into the sleeve, and the sleeve inserts into the second positioning hole.

18. The stacked expansion card assembly as claimed in claim 1, further comprising a third supporting member positioned on the first expansion card and supporting the second expansion card.

19. The stacked expansion card assembly as claimed in claim 18, wherein the third supporting member includes a sleeve and a bolt, the first expansion card comprises a forth positioning hole, the second expansion card comprises a fifth positioning hole, the bolt runs through the fifth positioning hole and inserts into the sleeve, and the sleeve inserts the forth positioning hole.

20. The stacked expansion card assembly as claimed in claim 18, further comprising a third connector positioned on the second expansion card and electrically connected or disconnected with a forth expansion card by removable insertion of the forth expansion card to the third connector.

21. The stacked expansion card assembly as claimed in claim 20, wherein the forth expansion card is parallel to the second expansion card.

* * * * *